US008912891B2

(12) United States Patent
Balthes et al.

(10) Patent No.: US 8,912,891 B2
(45) Date of Patent: Dec. 16, 2014

(54) APPARATUS HAVING AT LEAST ONE PACKAGING UNIT WITH AN RFID CHIP WHICH IS USED FOR RADIO-FREQUENCY IDENTIFICATION, AND METHOD THEREFOR

(71) Applicants: Eduard Balthes, Ingelheim am Rhein (DE); Johannes Geser, Gerlingen (DE)

(72) Inventors: Eduard Balthes, Ingelheim am Rhein (DE); Johannes Geser, Gerlingen (DE)

(73) Assignee: Boehringer Ingelheim International GmbH, Ingelheim am Rhein (DE)

( * ) Notice: Subject to any disclaimer, the term of this patent is extended or adjusted under 35 U.S.C. 154(b) by 0 days.

(21) Appl. No.: 13/767,156

(22) Filed: Feb. 14, 2013

(65) Prior Publication Data
US 2013/0162408 A1 Jun. 27, 2013

Related U.S. Application Data

(63) Continuation of application No. 12/669,847, filed as application No. PCT/EP2008/059263 on Jul. 16, 2008, now abandoned.

(30) Foreign Application Priority Data

Jul. 21, 2007 (DE) .......................... 10 2007 034 155

(51) Int. Cl.
*H04Q 5/22* (2006.01)
*G06K 19/07* (2006.01)
*G06K 19/077* (2006.01)

(52) U.S. Cl.
CPC ...... *G06K 19/07749* (2013.01); *G06K 19/0723* (2013.01); *G06K 19/0717* (2013.01); *G06K 19/07771* (2013.01)

USPC .......................... 340/10.1; 340/1.1; 340/10.4

(58) Field of Classification Search
USPC ......................... 340/10.1, 1.1, 10.4
See application file for complete search history.

(56) References Cited

U.S. PATENT DOCUMENTS 5,844,138 A * 12/1998 Cota .......................... 73/335.04
6,559,755 B1 * 5/2003 Hamamoto et al. ......... 340/10.6

(Continued)

FOREIGN PATENT DOCUMENTS

| JP | 2007060407 A | 3/2007 |
| WO | 0205039 A1 | 1/2002 |
| WO | 2006085291 A2 | 8/2006 |

OTHER PUBLICATIONS

International Search Report, Form PCT/ISA/210, for corresponding PCT/EP2008/059263; date of mailing: Nov. 20, 2008.

*Primary Examiner* — George Bugg
*Assistant Examiner* — Naomi Small
(74) *Attorney, Agent, or Firm* — Michael P. Morris; Mary-Ellen M. Devlin

(57) ABSTRACT

An apparatus having at least one RFID chip (30), which is surrounded by a metallic outer casing (11) of a packaging unit (1), used for radio-frequency identification and having a circuit (32) and an antenna structure (31), and a transmitting/receiving unit (41) for transmitting a transmission signal (42) and/or receiving a response signal (43) from the RFID chip (30), wherein the response signal (43) can be evaluated using an evaluation unit (44) which is connected to the transmitting/receiving unit (41), where the RFID chip (30) has an operating frequency in a frequency band (50) below a range of a blocking frequency (54) which is determined by the conductivity of the metallic outer casing (11) and the thickness thereof.

23 Claims, 2 Drawing Sheets

(56) References Cited

U.S. PATENT DOCUMENTS

Figure 1:
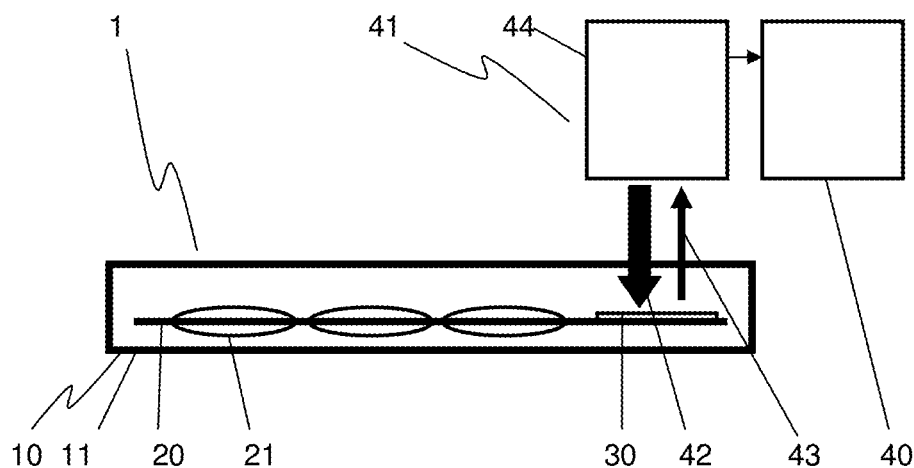

| | | |
|---|---|---|
| 6,640,615 B1 * | 11/2003 | Morrow .............................. 73/38 |
| 6,859,745 B2 * | 2/2005 | Carr et al. ........................ 702/81 |
| 6,984,403 B2 * | 1/2006 | Hagen et al. ................... 424/489 |
| 7,113,101 B2 * | 9/2006 | Petersen et al. ............... 340/590 |
| 7,592,914 B2 | 9/2009 | Sakama et al. |
| 2003/0007421 A1 * | 1/2003 | Niemiec et al. ................. 368/10 |
| 2004/0119608 A1 * | 6/2004 | Rao et al. ................. 340/870.01 |
| 2005/0237198 A1 * | 10/2005 | Waldner et al. ............ 340/572.7 |
| 2006/0131411 A1 * | 6/2006 | Huomo et al. ................. 235/451 |
| 2006/0202830 A1 | 9/2006 | Scharfeld et al. |
| 2008/0042849 A1 * | 2/2008 | Saito et al. ................. 340/572.7 |
| 2008/0186186 A1 * | 8/2008 | Campbell ................. 340/572.8 |

\* cited by examiner

APPARATUS HAVING AT LEAST ONE PACKAGING UNIT WITH AN RFID CHIP WHICH IS USED FOR RADIO-FREQUENCY IDENTIFICATION, AND METHOD THEREFOR

The invention relates to a device having at least one packaging unit with an RFID chip serving for radiofrequency identification, which comprises a switching circuit and an antenna structure, and a transmitting/receiving unit for sending a transmission signal and/or receiving a response signal from the RFID chip, the response signal being capable of evaluation by means of an evaluating unit connected to the transmitting/receiving unit.

The invention also relates to a method of identifying the content and/or condition of a packaging unit.

The development of pharmaceuticals is increasingly being driven into the range of highly effective but at the same time relatively delicate medicaments. This places increasing demands on their packaging and outer packaging. Foil containers or cavities on so-called blister cards, for example, serve inter alia to protect pharmaceutically active substance formulations from external environmental influences which may in some circumstances affect the pharmaceutical quality of the active substance formulation.

In order to achieve relatively high barrier qualities against moisture and gases in packaging, aluminium composite films or foils are often used, but these have the disadvantage that the outer packaging produced from them, for example so-called aluminium pouches, are non-transparent and it is not possible to identify the contents, e.g. To compare them with the information on the outer packaging, without destroying the outer packaging.

With medicaments of this kind the moisture introduced into the packaging by the product and by the individual packaging components, as well as the moisture that may penetrate into the packaging during storage, also plays an important role. It is therefore very useful to determine the moisture in a package as quickly as possible and in a number of packaging cavities (e.g. In blister cards) at the same time wherever possible, with a high degree of accuracy and especially in non-destructive manner. In addition, this measurement should be able to be carried out at reasonable cost.

In connection with the identification of the contents of packaging, radiofrequency identification systems which use so-called RFID chips, standing for "Radio Frequency Identification Device", are now in common use. RFID chips of this kind (transponders) can be detected using a scanning device. Depending on the type of transponder, in the simplest case it is possible to register the presence of the transponder, or to register a code which is transmitted back to the scanner from the transponder. RFID chips of this kind are sufficiently well described in the specialist literature (e.g. K. Finkenzeller: RFID-Handbuch, 4th edition, published by Carl Hanser, München, ISBN 3-446-40398-1).

The use of RFID chips for identification or monitoring of the conditions within packages with a conductive metal outer casing has not hitherto been possible as the so-called skin effect prevents the outer casing from being penetrated.

The aim of the invention is to provide a device and a method of the type mentioned hereinbefore which overcome(s) the above-mentioned disadvantages.

According to the invention, the aim is achieved by a device having at least one RFID chip enclosed by a metallic outer casing of a packaging unit and serving for radiofrequency identification, said RFID chip comprising a switching circuit and an antenna structure, and having a transmitting/receiving unit for sending a transmission signal and/or receiving a response signal from the RFID chip, the response signal being capable of evaluation by means of an evaluating unit connected to the transmitting/receiving unit and the RFID chip having an operating frequency that lies in a frequency band below a range of a blocking frequency which is determined by the conductivity of the metallic outer casing and its thickness.

The aim is also achieved by a method having the features of claim 16.

The shielding from electromagnetic radiation in metallic conductive packaging, provided by the skin effect, has hitherto prevented the use of RFID chips in aluminium composite pouches for example. The skin depth $\delta$ or depth of penetration for electromagnetic radiation refers to the thickness of a metal layer at which the electromagnetic field is attenuated to the $1/e^{th}$ value precisely by the skin effect, e being the Euler number. The skin depth $\delta$ is frequency-dependent when the material properties, such as the conductivity, remain the same, and rises sharply as the frequency falls. This very property of the skin effect can be used to overcome the previous difficulties in scanning an RFID chip within an aluminium pouch.

It has been shown experimentally that if the operating frequency is low enough the RFID chip within an aluminium pouch can be activated and scanned from outside reproducibly and as often as desired. Thus the contents of the packaging can be identified clearly but non-destructively.

When using aluminium composite pouches with an aluminium layer thickness of about 20 μm, corresponding to a range for the blocking frequency of about 100 MHz to 200 MHz, RFID chips which have an operating frequency LF-RFID (low frequency RFID) in the range from 20 to 500 kHz or an operating frequency HF-RFID (high frequency RFID) in the range from 3 to 30 MHz can be used successfully.

Theoretically, all operating frequencies below the blocking frequency are possible for reliable operation. However, only RFID chips with the above-mentioned operating frequency ranges are commercially obtainable. Another advantage arises from the fact that these RFID chips function passively, i.e. without an additional voltage source, thus making their use considerably easier. In addition, the short range of these RFID chips reduces the risk of confusion or crosstalk when scanning adjacent packages with RFID chips, and furthermore they are moisture-resistant.

The choice of suitable RFID chips is made possible by calculating the material- and layer thickness-specific attenuation of the electromagnetic radiation of the transmitting/receiving unit. The transmission power required of the transmitting/receiving unit can also be calculated and adjusted as necessary.

According to one feature the RFID chip has a sensor that influences the response signal of the RFID chip. Preferably, the response signal of the RFID chip is influenced in its coding and/or response frequency by the sensor connected to the RFID chip or integrated in the RFID chip and received and evaluated by the transmitting/receiving unit and the evaluating unit. In this way the condition inside the metallic outer casing is detected and a corresponding signal is sent out. Sensors of this kind may be for example temperature sensors or sensors that react to chemical changes and modify the response signal accordingly. As a result it is possible for example to determine the concentration of chemical substances.

Preferably, the sensor of the RFID chip is in the form of a capacitor structure and the capacitance or change in capacitance of the capacitor structure modifies the response signal from the RFID chip which can be evaluated by a measuring arrangement associated with the evaluating unit. The capacitor structure expediently comprises a dielectric, the dielectric constant ∈ of which is dependent on the relative humidity (r.h.) or a gas concentration, for example because of its hygroscopic nature. The response signal of the RFID chip is advantageously influenced in its coding and/or response frequency and received and evaluated by the transmitting/receiving unit that comprises the measuring arrangement. This makes it possible for example to produce a simple RFID chip that reacts to humidity, which can be used for non-destructive humidity measurement within the packaging unit.

A measuring arrangement for evaluating the response signal which is particularly suitable for the humidity evaluation described above comprises a measuring amplifier and a tunable capacitance measuring bridge. The response signal of the RFID chip is amplified by the measuring amplifier within the measuring arrangement and is determined by means of the tunable capacitance measuring bridge by comparing with a reference capacitance within the capacitance measuring bridge. This makes it possible to carry out very sensitive humidity measurements with relatively high accuracy.

The accuracy is further increased if calibration is carried out before the RFID chip with the sensor or capacitor structure is packed into the packaging unit. Preferably, for calibration, the RFID chip with the capacitor structure is subjected to specified humidity levels at a defined temperature in a dynamic vapour sorption scale (DVS), the response signal from the RFID chip is measured with the measuring arrangement at the different humidity levels and from this an inherent frequency dependent on the humidity is determined. This is done using a highly sensitive capacitive measuring bridge. The capacitor that is to be calibrated represents the unknown capacitance in an oscillating circuit. The magnitudes sought are produced as the oscillating circuit goes out of tune as a function of the humidity.

According to one feature the metal outer casing of a blister consists of an aluminium foil or film or a composite film consisting of at least one layer of aluminium and at least one other layer of plastics or paper. The metallic outer casing has an aluminium film or layer that is 10 to 50 µm thick. On the one hand this provides a good diffusion barrier, so that the pharmaceutical active substance is correspondingly protected. On the other hand, RFID chips within the packaging unit can still be reliably addressed.

An alternative packaging envisages having the metal outer casing as a component of an outer packaging, as is the case for example with aluminium composite pouch bags. The RFID chip is placed in the pouch bag as it is packed with the active substance contained in blister cards, for example, and the bag is then sealed.

For accurate positioning of the RFID chip within the outer packaging, the RFID chip is fixed within the outer packaging on a separate plastic card (inlay), to which it may be glued, for example. As a result the scanner is able to locate the RFID chip precisely, thus reducing the number of error sources and shortening the measuring time. The inlay may be suitably labeled, for patient protection, and can easily be disposed of by the patient when the packaging unit is opened. Alternatively, the RFID chip within the packaging is attached to the inside of the outer packaging.

If the outer packaging has at least one blister card to which the RFID chip is attached, the RFID chip may also be accurately positioned within the outer packaging.

Preferably, the metal outer casing is part of an aluminium composite cover film of a blister card, the RFID chip being located on the blister card or within a cavity in the blister card and covered by the aluminium composite cover film. The RFID chip is expediently attached, for example glued, to a separate plastic card (inlay) within the cavity in order to maintain its orientation within the cavity in the blister card relative to the cover film. As a result, the scanner can read the RFID chip relatively reliably, thus reducing the number of error sources and shortening the measuring time. It is theoretically also conceivable for the RFID chip with the capacitor structure mentioned above to be stuck to the cover or base film of the blister card.

Typical aluminium composite films are produced for example from aluminium and a plastic. Examples of materials that may be used for the plastic films include polyvinylchloride (PVC), cycloolefin copolymer (COC), polychlorotrifluoroethylene (PCFE), polyethylene (PE), polypropylene (PP), polyethylene terephthalate (PET), polycarbonate (PC), polyester (UP), polyacrylate, polyamide (PA) or other plastics. Blister packs with the following sequence of layers are envisaged for use, for example. The cover film is made of aluminium and has a thickness of 10 to 80 microns, preferably 20 to 50 microns, particularly 30 to 40 microns. The cover film is connected to the base film containing the cavities by means of a heat sealing lacquer so as to form a seal. The base film consists, on the side in contact with the product, of a layer of PVC, PP, PE or the like with a thickness of between 10 and 200 microns, preferably between 15 and 50 microns, particularly between 20 and 40 microns. This film is attached to an aluminium film with a thickness of preferably 30 to 60 microns, advantageously 35 to 50 microns. Adjoining the aluminium film is a polyamide film with a thickness of between 10 and 40 microns, preferably 15 to 30 microns. In the case of an alternative base film, the PVC film on the side facing the product is replaced by a polypropylene film or the like. In a preferred blister pack, the cover film consists of a 38 µm thick aluminium film and the heat sealing lacquer. The base film is produced, on the side facing the pharmaceutical product, from a PVC film 30 µm thick, an adjacent 45 µm thick aluminium film and an outer 20 µm thick polyamide film.

The invention preferably envisages the use of the packaging unit with the features described hereinbefore for pharmaceutical products. This, highly sensitive pharmaceutical products can be non-destructively identified in their packaging, which is advantageous particularly in terms of quality control, prevention of counterfeiting and the identification of clinical samples, i.e. medicaments produced in small production runs in which the identification of the contents is of particular importance.

The method described above for determining humidity, in particular, can be used for the non-destructive and accurate measurement of the humidity in blisters, pouches, polymer blisters, bottles or in containers and/or packaging in general having volumes ranging from the ml range to larger containers. Because of the possibility of being able to measure a plurality of packaging units in parallel, this provides a fast method of measuring humidity. Besides water it is also possible to determine the concentration of other vapours and gases, while the sensitivity of the dielectric of the capacitor structure of the RFID chip must be matched to the substance that is to be measured. The packaging may be the product itself or packaging means such as for example rolls of film, closure means containing desiccants and the like. The packaging may be for example an aluminium film composite, although other packages are not excluded, as the method is intended primarily for measuring humidity without destroying or impairing the outer packaging.

One application of this method is in the development of packaging, for example within the scope of stability testing. It is also possible to carry out online monitoring during production, for example on individual complete blister cards for monitoring the initial moisture levels in the cavities.

It will be understood that the features mentioned above and those to be described hereinafter may be used not only in the particular combination stated but also in other combinations. The scope of the invention is defined only by the claims.

Figure 2:
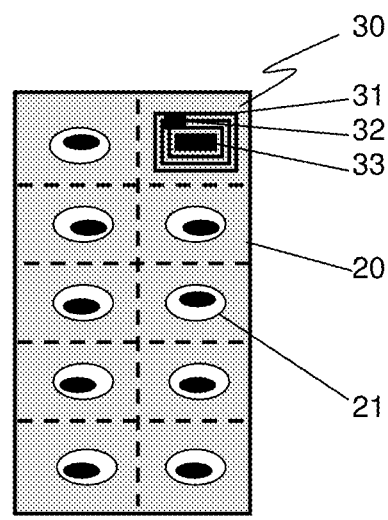
Figure 3:
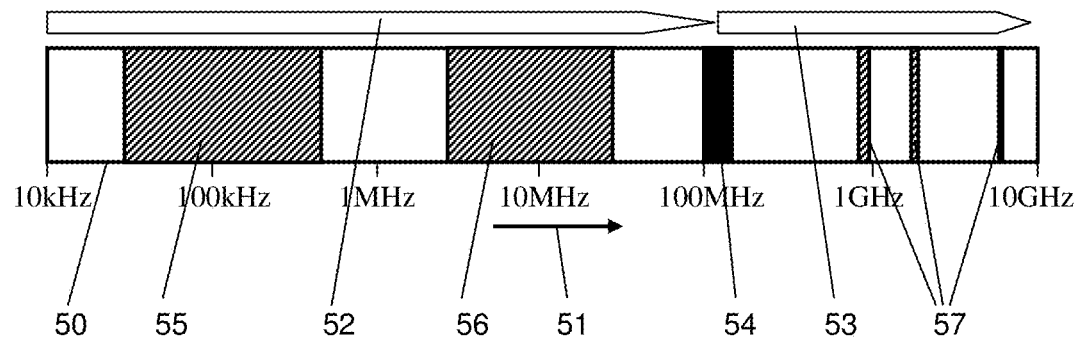
Figure 4:
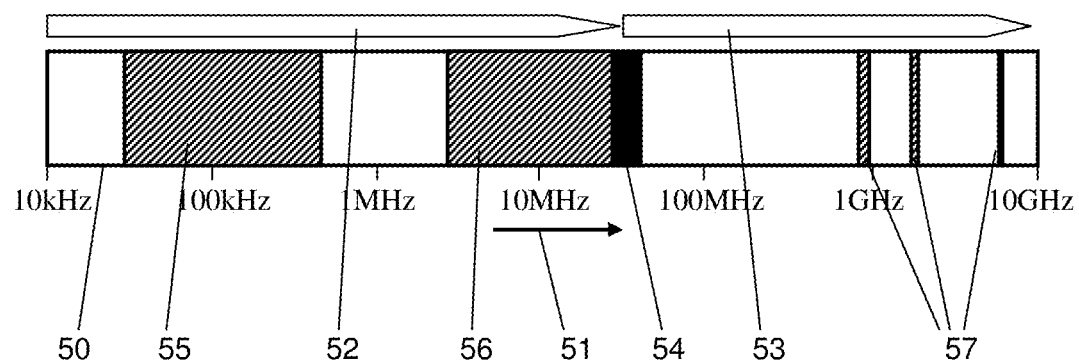

The invention is hereinafter described in more detail by means of a number of embodiments by way of example with reference to the associated drawings, wherein:

FIG. 1 shows a schematic representation of the device according to the invention, FIG. 2 shows a schematic plan view of a blister card with an RFID chip for use in the device according to FIG. 1, FIG. 3 shows a schematic representation of a frequency band having a range for a blocking frequency for a first embodiment of a metal outer casing and FIG. 4 shows a schematic representation of the frequency band having the range for a blocking frequency for a second embodiment of the metal outer casing.

A packaging unit 1 consists according to FIG. 1 of an outer packaging 10 having a metal outer casing 11, which is made up of an aluminium film or a composite film, consisting of at least one aluminium layer and at least one other plastics or paper layer. In the present case a so-called pouch bag is shown which has an aluminium composite film with a layer of aluminium about 20 μm thick. Inside the outer packaging 10 is a blister card 20 with a plurality of cavities 21 for holding pharmaceutical active substances, for example in the form of tablets or capsules.

Stuck to the blister card 20 is an RFID chip 30 which is activated and scanned by means of a transmitting/receiving unit 41 (scanner) outside the outer packaging 10. The transmitting/receiving unit 41 emits a transmission signal 42 and receives a response signal 43 from the RFID chip 30, which is evaluated in an evaluating unit 44 comprising a measuring arrangement 40, which is connected to the transmitting/receiving unit 41.

According to FIG. 2 the RFID chip 30 is provided in place of a cavity 21 on the blister card 20, for example stuck on to the blister card 20 or incorporated in the blister when the cavities 21 are sealed. The blister card 20 has an aluminium composite cover film which covers the RFID chip 30 and the cavities 21. The layer thickness of the aluminium layer in the cover film is about 45 μm.

The RFID chip 30 consists essentially of an antenna structure 31 in the form of a printed coil and a switching circuit 32 which, in the simplest case, merely sends back the response signal 43 when activated from outside. In more complex RFID chips 30 the switching circuit 32, when activated, may also send back a code by means of which the contents of the blister card 20 can be scanned, for example. The passive RFID chip 30 shown here has no battery.

Furthermore, the RFID chip 30 comprises a capacitor structure 33 the capacitance or change in capacitance of which modifies the response signal 43 of the RFID chip 30. The antenna structure 33 serves to charge up the capacitor structure 33 with the irradiated energy of the transmitting/receiving unit 41 and thereby provide enough energy to enable the actual switching circuit 32 of the RFID chip 30 to send its data back to the transmitting/receiving unit 41. If the capacitor structure 33 has a dielectric the dielectric constant $\in$ of which is dependent on the relative humidity (r.h.) an oscillating circuit can thus be produced, the inherent oscillation of which is dependent on the value of the capacitance of the capacitor structure 33 and hence on the relative humidity (r.h.). The change in the frequency of the response signal 43 is received by the transmitting/receiving unit 41, amplified with a measuring amplifier of the measuring arrangement 40 and measured by means of a tunable capacitance measuring bridge, from which finally the humidity in the packaging unit 1 can be determined.

Before the RFID chip 30 with the capacitor structure 33 is enclosed in the blister pack, calibration is carried out in which the capacitor structure 33 is subjected to particular humidity levels at a defined temperature in a dynamic vapour sorption scale. The response signal 43 from the RFID chip 30 is measured with the measuring arrangement 40 at the different humidity stages and from this an inherent frequency dependent on the humidity is determined Thus a calibration curve of humidity-dependent capacitance vs. Moisture content (or vs. relative humidity) can be determined.

The RFID chip 30 has an operating frequency which is in a frequency band 50 at which the frequency 51 is shown logarithmically, below a range of a blocking frequency 54 that is determined by the conductivity of the metallic outer casing 11 and its thickness. Below this blocking frequency 54 the frequency band 50 has a permeable range 52 and above it a blocking range 53. The result of the calculation shown in FIG. 3 was that, for an aluminium pouch with an aluminium film thickness of 20 μm, the pouch used blocks signals above a frequency of about 100 MHz, i.e. the electromagnetic field of the transmitter can be attenuated to values below the $1/e^{th}$ of the irradiated value. An operating frequency UHF-RFID 57 for the RFID chip 30 of more than 100 MHz is therefore unsuitable for scanning the information from a pouch of this kind. This applies particularly to the standard commercial UHF-RFID chips (ultra high frequency) whose operating frequencies are barely 1 GHz, 2 to 3 GHz or barely 6 GHz. By contrast, the RFID chips 30 with an operating frequency LF-RFID 55 in the range from 30 kHz to 500 kHz or with an operating frequency HF-RFID 56 in the range from 3 MHz to 30 MHz, in particular, are suitable for scanning. In this frequency range, the aluminium pouch is permeable.

FIG. 4 shows the conditions in the frequency band 50 for an aluminium layer thickness of 45 μm, as used for example in an aluminium composite cover film for blister-coating blister cards 20. The range of the blocking frequency 54 is about 30 MHz. Above this frequency the aluminium composite cover film blocks the electromagnetic radiation, so that scanning is no longer possible. Below this blocking frequency 54, the aluminium composite cover film of the blister card 20 is permeable.

What is claimed is:

1. A system having at least one RFID chip (30) belonging to a packaging unit (1) and being surrounded by a metal outer casing (11) of the packaging unit (1), said chip comprising a switching circuit (32) and an antenna structure (31), and a transmitting/receiving unit (41) for transmitting a transmission signal (42) and/or receiving a response signal (43) from the RFID chip (30), an evaluating unit (44) connected to the transmitting/receiving unit (41) which can evaluate the response signal (43), wherein the RFID chip (30) has an operating frequency which is in a frequency band (50) below a range of a blocking frequency (54) which is determined by the conductivity of the metal outer casing (11) and its thickness and wherein the RFID chip (30) has a sensor which influences the response signal (43) of the RFID chip (30), the sensor responding to condition inside the metallic outer casing and the out sent response signal corresponding to the condition.

2. The system according to claim 1,
characterized in that the RFID chip (30) has an operating frequency LF-RFID (55) in the range from 20 to 500 kHz or an operating frequency HF-RFID (56) in the range from 3 to 30 MHz.

3. The system according to claim 1,
characterized in that the sensor of the RFID chip (30) is constructed as a capacitor structure (33) and the capacitance or change in capacitance of the capacitor structure (33) modifies the response signal (43) from the RFID chip (30) which can be evaluated with a measuring arrangement (40) associated with the evaluating unit (44).

4. The system according to claim 3,
characterized in that the capacitor structure (33) comprises a dielectric the dielectric constant $\in$ of which is dependent on the relative humidity (r.h.) or on a gas concentration.

5. The system according to claim 3,
characterized in that the measuring arrangement (40) comprises, for evaluating the response signal (43), a measuring amplifier and a tunable capacitance measuring bridge.

6. The system according to claim 1,
characterized in that the metal outer casing (11) is made up of an aluminum film or a composite film consisting of at least one aluminum layer and at least one other layer of plastics or paper.

7. The system according to claim 6,
characterized in that the metal outer casing (11) has a 10 to 50 μm thick aluminum film or aluminum layer.

8. The system according to claim 1,
characterized in that the metal outer casing (11) is part of an outer packaging (10).

9. The system according to claim 8,
characterized in that the RFID chip (30) is attached to a separate plastic card inside the outer packaging (10).

10. The system according to claim 8,
characterized in that the RFID chip (30) is attached to the inside of the outer packaging (10) inside the outer packaging (10).

11. The system according to claim 8,
characterized in that the outer packaging (10) comprises at least one blister card (20) to which the RFID chip (30) is attached.

12. The system according to claim 1,
characterized in that the metal outer casing (11) is part of an aluminum composite cover film of a blister card (20), the RFID chip (30) being located on the blister card (20) or inside a cavity (21) in the blister card (20) and covered by the aluminum composite cover film.

13. The system according to claim 12,
characterized in that the RFID chip (30) is attached to a separate plastic card inside the cavity (21).

14. The system according to claim 1 and a pharmaceutical product.

15. A method of identifying the contents and/or condition of a packaging unit with an RFID chip (30) serving for radiofrequency identification, which has a switching circuit (32) and an antenna structure (31), wherein a transmitting/receiving unit (41) receives a response signal (43) from the RFID chip (30) and the response signal (43) is evaluated by means of an evaluating unit (44) connected to the transmitting/receiving unit (41), wherein the RFID chip (30) is surrounded or covered by a metal outer casing (11) that is part of the packaging unit (1) and is operated at an operating frequency that lies in a frequency band (50) below a range of a blocking frequency (54) which is determined by the conductivity of the metal outer casing (11) and its thickness wherein the response signal (43) of the RFID chip (30) is influenced in its coding and/or response frequency by means of a sensor connected to the RFID chips (30) or integrated in the RFID chip (30), the sensor responding to a condition inside the metallic outer casing and the out sent response signal corresponding to the condition.

16. The method according to claim 15, characterized in that the RFID chip (30) is operated at an operating frequency LF-RFID (55) in the range from 20 to 500 kHz or an operating frequency HF-RFID (56) in the range from 3 to 30 MHz.

17. The method according to claim 15, characterized in that the response signal (43) of the RFID chip (30) is modified in its frequency by means of a capacitor structure (33) which is connected to the RFID chip (30) or is integrated therein and the dielectric constant $\in$ of which is influenced by the relative humidity (r.h.) or by a gas concentration, and is received and evaluated by a measuring arrangement (40) of the evaluating unit (44) of the transmitting/receiving unit (41).

18. The method according to claim 17, characterized in that the response signal (43) of the RFID chip (30) is amplified by means of a measuring amplifier within the measuring arrangement (40) and the capacitance of the capacitor structure (33) of the RFID chip (30) is determined by means of a tunable capacitance measuring bridge within the measuring arrangement (40) by comparison with a reference capacitance within the capacitance measuring bridge.

19. The method according to claim 15, characterized in that before the RFID chip (30) with the sensor or the capacitor structure (33) is packed into the packaging unit (1) calibration is carried out.

20. The method according to claim 19, characterized in that, for the calibration, the RFID chip (30) with the capacitor structure (33) is subjected to specified humidity levels at a defined temperature in a dynamic vapor sorption scale, the response signal (43) from the RFID chip (30) is measured with the measuring arrangement (40) at the different humidity levels and from this an inherent frequency dependent on the humidity is determined.

21. The method according to claim 15 for the measurement of humidity or a gas concentration in blisters, pouches, polymer blisters, bottles or containers and/or packaging in general with volumes ranging from the ml range to larger containers, and in the development of packaging and for online monitoring during production.

22. The system according to claim 1 wherein the sensor is a temperature sensor or a sensor that reacts to chemical changes and wherein the response signal is modified by the changes.

23. The system according to claim 1 wherein the RFID chip reacts to humidity.

* * * * *